United States Patent
Taylor et al.

(10) Patent No.: US 10,256,914 B2
(45) Date of Patent: Apr. 9, 2019

(54) SINGLE SOURCE OPTICAL TRANSMISSION

(71) Applicant: Facebook, Inc., Menlo Park, CA (US)

(72) Inventors: Jason Taylor, Berkeley, CA (US); Narsing Vijayrao, Santa Clara, CA (US)

(73) Assignee: Facebook, Inc., Menlo Park, CA (US)

( * ) Notice: Subject to any disclaimer, the term of this patent is extended or adjusted under 35 U.S.C. 154(b) by 12 days.

(21) Appl. No.: 15/290,970

(22) Filed: Oct. 11, 2016

(65) Prior Publication Data

US 2017/0104543 A1 Apr. 13, 2017

Related U.S. Application Data

(60) Provisional application No. 62/240,993, filed on Oct. 13, 2015.

(51) Int. Cl.
| | |
|---|---|
| *H04B 10/08* | (2006.01) |
| *H04B 17/00* | (2015.01) |
| *H04J 14/00* | (2006.01) |
| *H04B 10/00* | (2013.01) |
| *H04B 10/516* | (2013.01) |
| *H04B 10/50* | (2013.01) |
| *H04B 10/25* | (2013.01) |
| *H04B 10/2587* | (2013.01) |
| *H04B 10/40* | (2013.01) |

(52) U.S. Cl.
CPC ....... *H04B 10/516* (2013.01); *H04B 10/2503* (2013.01); *H04B 10/2587* (2013.01); *H04B 10/40* (2013.01); *H04B 10/503* (2013.01)

(58) Field of Classification Search
CPC .............. H04B 10/2587; H04B 10/505; H04B 10/506; H04B 10/1125; H04B 10/272; H04J 14/0226
USPC ..................... 398/26, 68, 135, 164
See application file for complete search history.

(56) References Cited

U.S. PATENT DOCUMENTS

| | | | | |
|---|---|---|---|---|
| 4,642,804 | A * | 2/1987 | Personick | H04B 10/2587 398/144 |
| 5,408,350 | A | 4/1995 | Perrier et al. | |
| 5,608,565 | A * | 3/1997 | Suzuki | H04B 10/272 359/237 |
| 5,786,923 | A * | 7/1998 | Doucet | H04B 10/1121 398/122 |
| 5,963,684 | A * | 10/1999 | Ford | G02B 6/12007 359/11 |
| 7,583,423 | B2 * | 9/2009 | Sutherland | C09K 19/544 349/202 |
| 7,796,896 | B2 * | 9/2010 | Sikora | H04B 10/2587 398/150 |
| 2002/0154857 | A1 * | 10/2002 | Goodman | G02B 6/2713 385/24 |
| 2003/0035184 | A1 * | 2/2003 | Deguchi | H04B 10/0771 398/177 |

(Continued)

*Primary Examiner* — David C Payne
*Assistant Examiner* — Pranesh K Barua
(74) *Attorney, Agent, or Firm* — Van Pelt, Yi & James LLP

(57) ABSTRACT

Systems and methods for optical communication using single source optical transmission are disclosed. A representative method includes receiving optical signals at a first frequency by a receiver (RX) from an optical fiber. The received optical signals are routed to a modulator that modulates the optical signals at a second frequency. The optical signals are emitted by a transmitter (TX) back to the optical fiber at the second frequency.

23 Claims, 4 Drawing Sheets

(56) References Cited

U.S. PATENT DOCUMENTS

| | | | |
|---|---|---|---|
| 2004/0042794 A1* | 3/2004 | Kim | H04B 10/506 398/79 |
| 2004/0264963 A1* | 12/2004 | Kani | H04J 14/0226 398/72 |
| 2005/0025484 A1* | 2/2005 | Jung | H04B 10/2587 398/68 |
| 2006/0093359 A1* | 5/2006 | Lee | H04B 10/2587 398/70 |
| 2006/0146855 A1* | 7/2006 | Kani | H04J 14/0226 370/430 |
| 2007/0127928 A1* | 6/2007 | Varshneya | H04B 10/2587 398/135 |
| 2007/0189779 A1* | 8/2007 | Murphy | H04B 10/2587 398/187 |
| 2008/0107419 A1* | 5/2008 | Won | H04B 10/1143 398/130 |
| 2008/0131125 A1* | 6/2008 | Byoung Whi | H04B 10/2587 398/72 |
| 2008/0152345 A1* | 6/2008 | Park | H04B 10/272 398/79 |
| 2008/0187314 A1* | 8/2008 | Chung | H04B 10/2587 398/72 |
| 2009/0034985 A1* | 2/2009 | Fattal | H04B 10/803 398/164 |
| 2009/0116848 A1* | 5/2009 | Kim | H03M 5/12 398/140 |
| 2009/0202254 A1* | 8/2009 | Majumdar | H04B 10/1123 398/140 |
| 2009/0285583 A1* | 11/2009 | Winker | H04B 10/1125 398/152 |
| 2010/0080394 A1* | 4/2010 | Harrison | H04B 10/114 380/278 |
| 2010/0142962 A1* | 6/2010 | Poustie | G02B 6/12021 398/91 |
| 2010/0158512 A1* | 6/2010 | Chang | H04J 14/0278 398/7 |
| 2010/0329680 A1* | 12/2010 | Presi | H04B 10/2587 398/79 |
| 2011/0116792 A1* | 5/2011 | Blumenthal | H04B 10/801 398/43 |
| 2011/0170862 A1* | 7/2011 | Smith | H04B 10/2587 398/26 |
| 2013/0170834 A1* | 7/2013 | Cho | H04J 14/0278 398/58 |
| 2014/0079404 A1* | 3/2014 | Kykta | H04B 10/1129 398/128 |
| 2014/0369690 A1* | 12/2014 | Sung | H04J 14/0227 398/72 |
| 2015/0125159 A1* | 5/2015 | Kim | H04B 10/501 398/183 |
| 2015/0311669 A1* | 10/2015 | Chuang | H01S 5/0064 398/65 |
| 2017/0126319 A1* | 5/2017 | Cavaliere | H04B 10/2575 |

* cited by examiner

SINGLE SOURCE OPTICAL TRANSMISSION

CROSS-REFERENCE TO RELATED APPLICATION(S)

This application claims priority to and benefit from U.S. Provisional Patent Application Ser. No. 62/240,993 titled "SINGLE SOURCE OPTICAL TRANSMISSION" filed on Oct. 13, 2015, the content of which is incorporated by reference in its entirety herein.

TECHNICAL FIELD

The disclosed embodiments are generally related to the field of optical communication, and more specifically to using a common source of light for two-way optical communication. For example, optical signals received by a transceiver at a first frequency can be modulated to a second frequency and retransmitted at the second frequency to a different transceiver.

BACKGROUND

Optical communication systems transfer optical signals from a transmitter (TX) of one system to a receiver (RX) of another system. In general, optical signals can be transmitted through an optical fiber at relatively high data rates and relatively low signal attenuation, therefore making such data transmission suitable for, e.g., telephony, Internet and cable television. In general, optical signals can be sent through an optical fiber in either direction from one end of the optical fiber to another. For example, a dedicated source of light and a TX on one end of the optical fiber can be in communication with a corresponding RX on the opposite end of the optical fiber.

FIG. 1 schematically illustrates an optical communication system 10. A transceiver 12 includes a laser L, a modulator M and a demodulator (also known as a detector) D. The laser L generates an optical beam that is suitably modulated by the modulator M into a stream of optical signals 13. A transmitter TX routes the stream of optical signals 13 to an optical fiber 14. Due to relatively low signal attenuation, the optical fiber 14 can transfer signals over long distances, e.g., tens or hundreds of kilometers. At the other side of the optical fiber 14, the optical signals 13 are received by a receiver RX and demodulated by a demodulator D of a transceiver 16. When the optical communication system 10 sends optical signals 15 in the opposite direction, i.e., from the transceiver 16 to the transceiver 12, a laser L of the optical transceiver 16 generates an optical beam, a modulator M modulates the optical beam into a stream of optical signals 15, and a transmitter TX routes the optical signals through the optical fiber 14 back toward the transceiver 12.

However, the optical communication system 10 includes a relatively large number of components, including two lasers. In conventional optical communication systems, the lasers are typically the most expensive components and can also consume significant amounts of energy to operate. Furthermore, the relatively high complexity of these conventional optical communication systems results in the correspondingly high number of failures that, in turn, increase system downtime and repair cost. Accordingly, there remains a need for simple, low cost and high availability optical communication systems.

DETAILED DESCRIPTION

Figure 1:
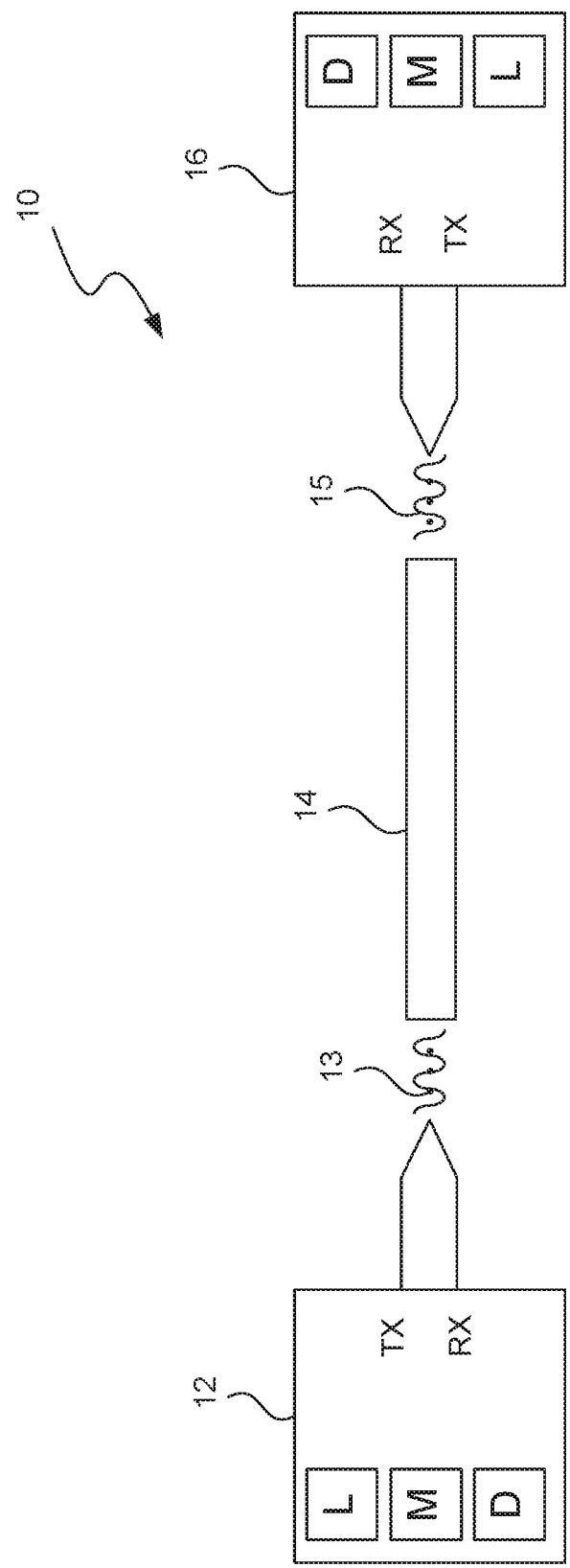
FIG. 1 is an optical communication system 10.

Specific details of several embodiments of representative optical data communication systems and methods are described below. The described embodiments use fewer sources of light (e.g., lasers) to achieve two-way communication through an optical fiber or air.

In various embodiments, a source of light (e.g., a laser, or one or more light emitting diodes (LED)) can generate a beam of light that is transmitted to a first transceiver. The beam of light can include multiple wavelengths (i.e., frequencies), or light polarizations. Next, a modulator of the first transceiver modulates a stream of optical signals (e.g., digital information, data) at a first frequency (or at a specific wavelength, polarization angle, or phase). The stream of optical signals can be transmitted through an optical fiber or through air to a second transceiver. In some embodiments, a demodulator (detector) of the second transceiver demodulates (e.g., reads out) the incoming optical signals, and transfers the optical signals through a suitable channel (e.g., an optical fiber, an optical switch, a reflective mirror, etc.) to a modulator of the second transceiver. In some embodiments, the modulator of the second transceiver modulates the optical signals using light at a second frequency (or wavelength, polarization angle, or phase) as a carrier. This carrier can be referred to as a "carrier light." The modulated optical signals that use the second frequency as a carrier frequency can be transmitted from the second transceiver back to the first transceiver for further demodulation (e.g., data extraction) and/or other processing. Because of different frequencies used to carry the streams of optical signals, the transceivers can differentiate between the streams of optical signals using, for example, frequency band pass filters (or, e.g., polarizing filters for the optical signals having different polarizations). As a result, in some embodiments a two-way optical communication can be established based on a single source of light, e.g., a single laser or an LED capable of emitting light at different frequencies (or wavelengths, polarization angles, or phases). Because in some practical applications the source of light can be relatively expensive and/or more failure-prone than other components, the disclosed embodiments can provide a less expensive and/or more robust optical communication. Furthermore, in at least some embodiments, the above-described two-way optical communication can take place through the same optical fiber or wirelessly through line of sight in air.

In some embodiments, the system may include additional transceivers. For example, the optical signals at the second frequency can be forwarded to another transceiver (e.g., a third transceiver) that demodulates the incoming optical signals at the second frequency, modulates the optical signals at a third frequency, and then transmits the modulated optical signals to a fourth transceiver or back to the first or second transceiver. As explained above, the transceivers may filter the streams of the optical signals using, for example, bandpass frequency filters.

In some embodiments, the transceivers can be connected to a common optical fiber via optical switches (e.g., Q-switches) that route the optical signals to the RXs. In some embodiments, the optical resonators may be tunable to adjust their peak sensitivities closer to the frequencies of the targeted optical signals.

Figure 2:
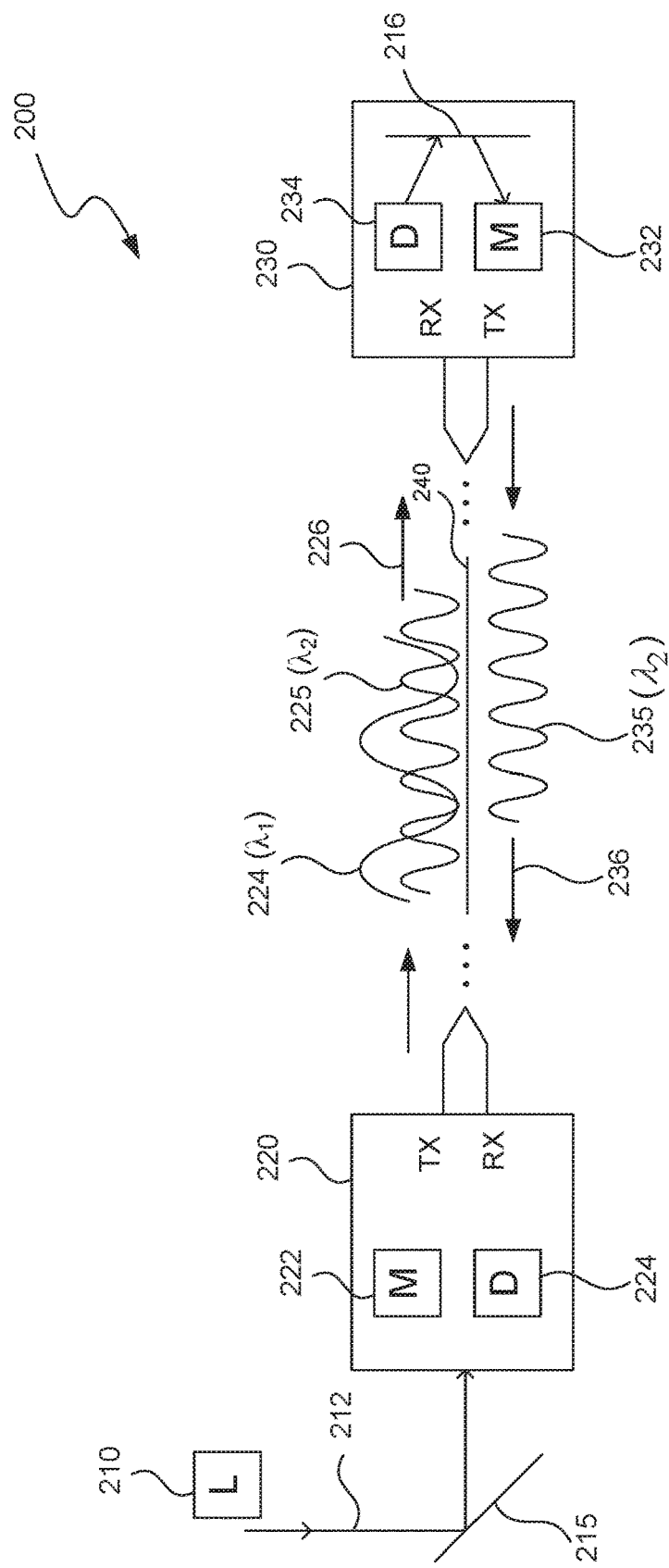
FIG. 2 is a schematic diagram of an optical communication system in accordance with an embodiment of the present technology.

FIG. 2 is a schematic diagram of an optical communication system 200 in accordance with an embodiment of the present technology. The optical communication system 200 can maintain a two-way communication between transceivers 220/230 using a single source of light 210 (e.g., a laser or an LED). In the illustrated embodiment, a laser 210 emits an optical beam 212 that includes multiple wavelengths of light (e.g., $\lambda_1$, $\lambda_2$, etc.). In some embodiments, a mirror 215 routes the optical beam 212 toward a transceiver 220 that may include a modulator 222 and a demodulator 224. The modulator 222 can modulate the optical beam 212 to a data stream 226 using the wavelength $\lambda_1$. Some examples of data modulation formats are dual-polarization quadrature-phase-shift keying (DP-QPSK), binary PSK (BPSK), and Quadrature Amplitude Modulation (QAM). A transmitter (TX) can receive the data stream 226 from the modulator 222, and direct the data stream 226 to an optical fiber 240. In the illustrated embodiment, the data stream 226 propagates through the optical fiber 240 as the waveform 225 at the wavelength $\lambda_1$, while the wavelength $\lambda_2$ is not modulated with the data. In other embodiments, the data stream 226 may be characterized by polarization angle (e.g., $\theta_1$), phase (e.g., $\varphi_1$), frequency (e.g., $f_1$) or a portion of time domain (e.g., time interval ($t_0$, $t_1$) reserved for the data stream 226). In some embodiments, the data stream 226 can travel as the waveform 225 having multiple wavelengths $\lambda_i$ (e.g., $\lambda_1$ and $\lambda_2$), while reserving some wavelengths (e.g., $\lambda_3$ and/or $\lambda_4$) for modulation of the return signal. The optical fiber 240 can be single-stranded or multi-stranded. In some embodiments, the waveforms may travel through air as wireless signals.

In some embodiments, the RX of a transceiver 230 can receive the data stream 226 at the opposite end of the optical fiber 240 or, using suitable optical switches, at some intermediate point along the optical fiber 240. A demodulator 234 can demodulate the received data stream 226. In the illustrated embodiment, after leaving the demodulator 234, the optical beam reflects from a mirror 216 toward a modulator 232, which can modulate the reflected optical beam at the wavelength $\lambda_2$ using, for example, DP-QPSK, BPSK, QAM or other data modulation. The modulated data stream 236 can be sent to the transceiver 220 as a waveform 235 having a wavelength $\lambda_2$. Because the datastreams 226 and 236 are modulated using different wavelengths ($\lambda_1$ and $\lambda_2$, respectively), the RXs of the transceivers 220/230 can distinguish between the data streams using, for example, optical bandpass filters to receive the desired and to reject the undesired wavelengths/frequencies. Therefore, in the illustrated system 200, the transceivers 220 and 230 can use a single source of light (e.g., the laser 210 capable of emitting light at multiple wavelengths) for a two-way communication along the common optical fiber 240.

Figure 3:
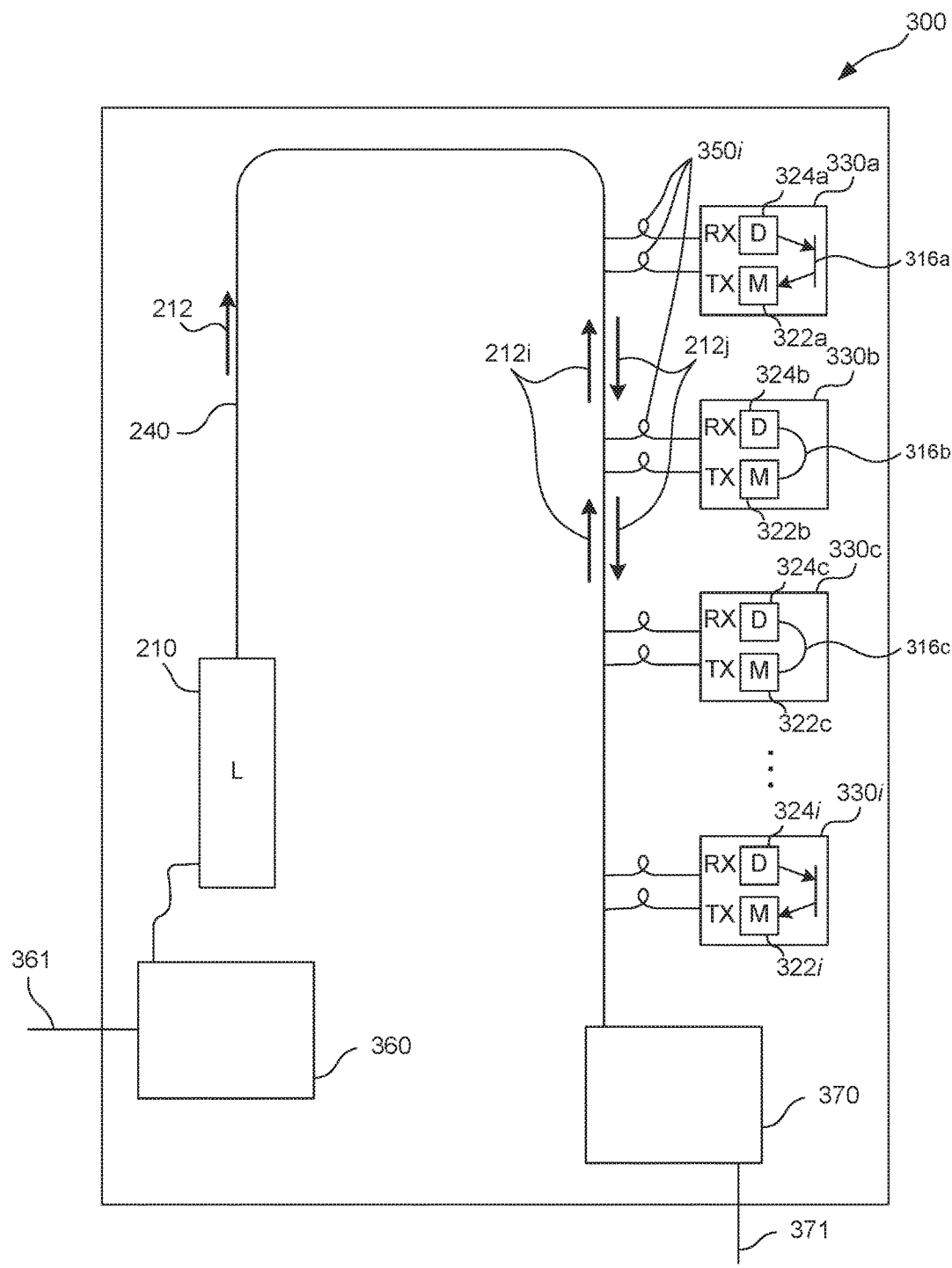
FIG. 3 is a schematic diagram of an optical communication system in accordance with an embodiment of the present technology.

FIG. 3 is a schematic diagram of an optical communication system 300 in accordance with an embodiment of the present technology. In some embodiments, the optical communication system 300 may be an optical signal router. The illustrated system 300 includes several transceivers 330a-330i that can optically communicate using common optical fiber 240. With the illustrated system 300, the laser 210 emits optical beam 212 at several wavelengths (e.g., $\lambda_a$, $\lambda_b$, $\lambda_c$, ..., $\lambda_i$) that propagate through the optical fiber 240. In other embodiments, the optical beam 212 can travel wirelessly through air and can be routed using optical mirrors (not shown). An input controller 360 can control the laser 210 by, for example, controlling frequency or intensity of the laser light.

In some embodiments, optical switches 350i connect the optical transceivers 330a-330i with the optical fiber 240. The optical switches 350i may be designed or configured to route optical signals at a specific wavelength $\lambda_i$ to/from the respective transceivers 330a-330i. In some embodiments, the optical switches can be Micro Electro Mechanical System (MEMS) based Q-switches. The optical switches 350i typically operate as filters having a relatively narrow wavelength/frequency bandpass, e.g., an individual optical switch 350i passes optical signals at a wavelength $\lambda_i$, while rejecting optical signals at other wavelengths. In some embodiments, the optical switches may filter the optical signals based on polarization or phase of the optical signals. As a result, the RXs of the transceivers 330i can receive optical signals at a relatively narrow-band wavelength, frequency, polarization or phase. After the RX receives the optical signals at the wavelength $\lambda_0$, a demodulator 324a can demodulate the optical signals and route the signals to a modulator 322a via an optical mirror 316a. In other embodiments, an optical fiber (e.g., comparable to the optical fiber 316b) can route optical signals from the demodulator to the modulator of the transceiver 330a. The modulator 322a can modulate the optical signals using the light at the wavelength $\lambda_a$ (or polarization angle $\theta_a$, phase $\varphi_a$, frequency $f_a$, or a time domain ($t_0$, $t_a$) that is reserved for the transceiver 330a). The TX can route the optical signals back to the optical fiber 240 via an optical switch 350i. In some embodiments, at least one of the other transceivers in the system 300, e.g., the transceiver 330c, may be coupled to the optical fiber 240 with the optical switch 350 having a bandpass wavelength $\lambda_a$. Therefore, the RX of the transceiver 330c can receive the modulated optical signals from the transceiver 330a. The received optical signals can be demodulated by a demodulator 324c and forwarded through the optical fiber 316c to a modulator 322c for a modulation using, for example, a wavelength $\lambda_c$ (e.g., $\lambda_c$ being a carrier wavelength). Other routings of optical signals among the transceivers of the system 300 are also possible. In at least some embodiments, the laser 210 emits light of sufficient intensity to meet the threshold sensitivities of the RX's of all the transceivers in the optical router 300. In some embodiments, the optical resonators may be tunable to adjust their peak sensitivities closer to the frequencies (or wavelengths, polarization angles, phases, etc.) of the targeted optical signals. An output controller 370 can route the output signals out of the system 300 through an optical or electrical cable 371.

Figure 4:
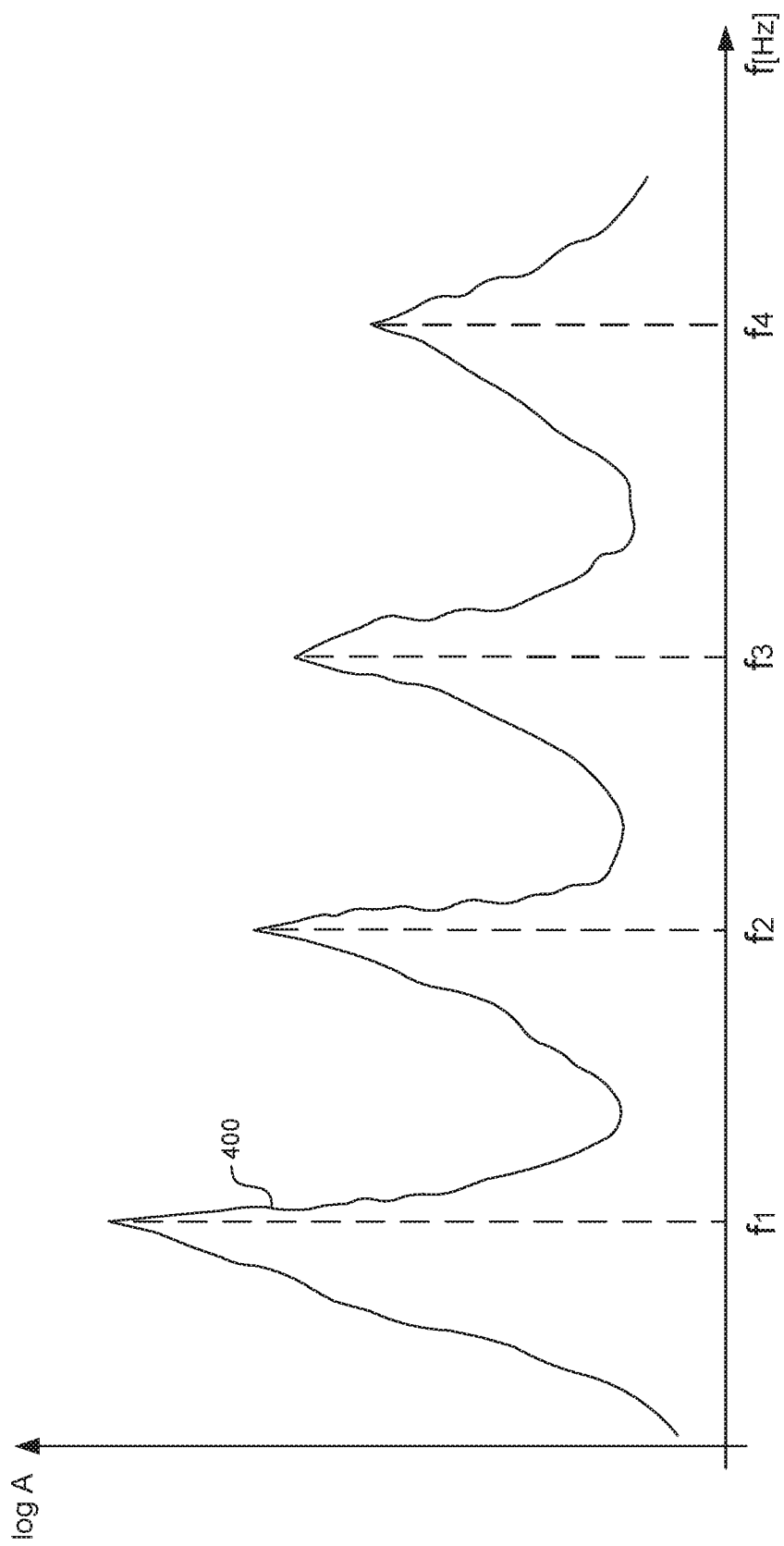
FIG. 4 is a graph diagram of distribution of signal frequencies in accordance with an embodiment of the present technology.

FIG. 4 is a graph diagram of a distribution of signal frequencies in accordance with an embodiment of the present technology. The horizontal axis represents the frequency of the optical signals. The vertical axis represents the amplitude of the optical signals on the logarithmic scale. A graph 400 illustrates distribution of signal amplitudes over a range of frequencies within, for example, the optical fiber 240. Generally, an optical switch 350 has a bandpass frequency that corresponds to one of the peak frequencies $f_1$-$f_4$, therefore being capable of routing the optical signals at that peak frequency to its corresponding RX. The graph 400 illustrates the peak frequencies of the optical switches, but analogous graphs can be constructed for wavelengths, polarization angles or phases of the optical signals.

From the foregoing, it will be appreciated that specific embodiments of the invention have been described herein for purposes of illustration, but that various modifications may be made without deviating from the scope of the various embodiments of the invention. For example, in some embodiments optical signals at multiple wavelengths may be transmitted to a single transceiver using multiple optical switches that are tuned to different wavelengths. The received optical signals can be demodulated and then modulated to one or more outgoing wavelengths before being routed back to the optical fiber. In some embodiments, multiple transceivers may receive the optical signals at a single wavelength, and transmit the output optical signals at multiple wavelengths. Furthermore, while various advantages and features associated with certain embodiments of the disclosure have been described above in the context of those embodiments, other embodiments may also exhibit such advantages and/or features, and not all embodiments need necessarily exhibit such advantages and/or features to fall within the scope of the disclosure. Accordingly, the disclosure is not limited, except as by the appended claims.

We claim:

1. A method for optical communication, comprising:
receiving optical signals that include a first signal component at a first frequency of a carrier light by a receiver (RX) via an optical fiber, wherein the received optical signals also include a second signal component at a second frequency and a third signal component at a third frequency;
routing at least a portion of the optical signals to a modulator;
modulating the second signal component of the received optical signals at the second frequency;
emitting the modulated second signal component of the optical signals by a transmitter (TX) via the optical fiber at the second frequency, wherein the emitted modulated second signal component of the optical signals is at the same second frequency as the second frequency of the second signal component originally included in the received optical signals;
receiving at a second receiver at least the third signal component of the optical signals at the third frequency;
routing at least a portion of the third signal component of the optical signals to a second modulator; and
modulating by the second modulator at least the portion of the third signal component at the third frequency.

2. The method of claim 1 wherein the routing is at least in part performed by reflecting an optical beam with a mirror, wherein the optical beam includes the optical signals at the first frequency.

3. The method of claim 1 wherein the routing is at least in part performed by a mirror.

4. The method of claim 1 wherein the optical fiber is a first optical fiber and wherein the routing is at least in part performed by a second optical fiber.

5. The method of claim 1, further comprising demodulating the optical signals at the first frequency by a demodulator.

6. The method of claim 1, further comprising generating an optical beam by a laser, the optical beam including light at the first frequency and at the second frequency.

7. The method of claim 1 wherein the RX is a first RX, the modulator is a first modulator, and the TX is a first TX, the method further comprising:
receiving at least a portion of the optical signals by a third RX via the optical fiber, wherein at least the portion of the optical signals received by the third RX includes the second signal component at the second frequency.

8. A method for optical communication, comprising:
receiving optical signals by a first receiver (RX) from an optical fiber, wherein the optical signals are carried at least in part by a light having a first property, a second property and a third property, wherein each of the first, second and third properties is one or more of a frequency, a wavelength, a polarization angle, a phase, or a portion of time domain, or a combination thereof;
routing at least a portion of the optical signals to a first modulator;
modulating by the first modulator at least a portion of the optical signals using the second property of the light carrying the optical signals; and
transmitting at least the modulated portion of the optical signals by a first transmitter (TX) the second property; and
receiving the optical signals by a second RX via the optical fiber, wherein at least a portion of the optical signals have the second property;
routing at least a portion of the optical signals to a second modulator;
modulating by the second modulator at least a portion of the optical signals using the third property of the light carrying the optical signals; and
transmitting at least the modulated portion of the optical signals by a second TX using the third property.

9. The method of claim 8, further comprising generating an optical beam by a laser, the optical beam including the light at the first property and at the second property.

10. The method of claim 8 wherein the routing is at least in part performed by reflecting an optical beam with a minor, wherein the optical beam includes the optical signals at a first frequency.

11. The method of claim 8 wherein the optical fiber is a first optical fiber and wherein the routing of the optical signals to the modulator is at least in part performed by a second optical fiber.

12. The method of claim 8, further comprising demodulating the optical signals by a demodulator.

13. The method of claim 8 wherein the optical signals are received by the second RX via an optical switch.

14. The method of claim 8 wherein the optical switch is a Q-switch.

15. The method of claim 8 wherein the optical switch is tunable.

16. A transceiver, comprising:
a receiver (RX) configured to receive optical signals that include a first signal component at a first frequency of a carrier light via an optical fiber, wherein the received optical signals also include a second signal component at a second frequency and a third signal component at a third frequency;
a mirror configured to reflect the second signal component of the optical signals toward a modulator;
the modulator configured to modulate the second signal component of the received optical signals at the second frequency;
a transmitter (TX) configured to emit the modulated second signal component of the optical signals via the optical fiber at the second frequency, wherein the emitted modulated second signal component of the optical signals is at the same second frequency as the second frequency of the second signal component originally included in the received optical signals;
receiving at a second receiver at least the third signal component of the optical signals at the third frequency;
routing at least a portion of the third signal component of the optical signals to a second modulator; and modulating by the second modulator at least the portion of the third signal component at the third frequency.

17. The transceiver of claim 16, further comprising an optical fiber for transmitting the optical signals.

18. A system for optical communication, comprising:
  a first transceiver having:
    a first receiver (RX) for receiving optical signals carried by a light at a first frequency;
    a first light router to route the optical signals at the first frequency toward a first modulator;
    the first modulator for modulating the optical signals using the light at a second frequency, wherein the second frequency is different from the first frequency; and
    a first transmitter (TX) for transmitting the optical signals at the second frequency;
  a second transceiver having:
    a second RX for receiving the optical signals at the second frequency;
    a second light router to route the optical signals at the second frequency toward a second modulator;
    the second modulator for modulating the optical signals using the light at a third frequency, wherein the third frequency is different from the second frequency; and
    a second TX for transmitting the optical signals at the third frequency; and
  an optical fiber for optically connecting the first transceiver with the second transceiver.

19. The system of claim 18 wherein the first router includes a mirror.

20. The system of claim 18, further comprising a laser in optical communication with the optical fiber, wherein the laser is configured to generate light at the first frequency, the second frequency and the third frequency.

21. The system of claim 18, further comprising a light emitting diode (LED) in optical communication with the optical fiber, wherein the LED is configured to generate light at the first frequency, the second frequency and the third frequency.

22. The system of claim 18 wherein the optical fiber is a single-strand optical fiber.

23. The system of claim 18 wherein the optical fiber is optically connected with the first transceiver and the second transceiver by one or more optical switches.

* * * * *